(12) United States Patent
Freedman et al.

(10) Patent No.: US 11,623,290 B2
(45) Date of Patent: Apr. 11, 2023

(54) METHOD OF MACHINING GAS TURBINE ENGINE COMPONENTS

(71) Applicant: United Technologies Corporation, Farmington, CT (US)

(72) Inventors: Alex C. Freedman, Rocky Hill, CT (US); Paul R. Faughnan, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 193 days.

(21) Appl. No.: 16/289,740

(22) Filed: Mar. 1, 2019

(65) Prior Publication Data

US 2020/0108458 A1 Apr. 9, 2020

Related U.S. Application Data

(60) Provisional application No. 62/741,866, filed on Oct. 5, 2018.

(51) Int. Cl.
| | |
|---|---|
| *B23H 9/10* | (2006.01) |
| *B23H 3/04* | (2006.01) |
| *B23H 7/26* | (2006.01) |
| *F01D 5/28* | (2006.01) |

(52) U.S. Cl.
CPC .............. *B23H 9/10* (2013.01); *B23H 3/04* (2013.01); *B23H 7/26* (2013.01); *F01D 5/286* (2013.01); *F05D 2230/11* (2013.01)

(58) Field of Classification Search
None
See application file for complete search history.

(56) References Cited

U.S. PATENT DOCUMENTS

| | | | |
|---|---|---|---|
| 4,999,093 A | 3/1991 | Moracz | |
| 5,149,405 A | 9/1992 | Bruns et al. | |
| 5,244,548 A * | 9/1993 | Bruns | B23H 9/10 |
| | | | 416/189 |
| 6,454,526 B1 | 9/2002 | Cunha et al. | |
| 7,204,926 B2 | 4/2007 | Lamphere et al. | |
| 7,462,273 B2 | 12/2008 | Mielke | |
| 7,967,659 B2 * | 6/2011 | Erickson | B23C 3/18 |
| | | | 451/5 |
| 8,034,228 B2 | 10/2011 | Bayer et al. | |
| 8,161,641 B2 | 4/2012 | Lamphere et al. | |

(Continued)

FOREIGN PATENT DOCUMENTS

| | | | |
|---|---|---|---|
| EP | 0327657 A1 * | 8/1989 | ............ B23H 9/10 |
| EP | 2022587 A1 | 2/2009 | |

(Continued)

OTHER PUBLICATIONS

English Translation of EP2786826, Arbinger et al., 2014. (Year: 2014).*

(Continued)

*Primary Examiner* — Stefanie S Wittenberg
(74) *Attorney, Agent, or Firm* — Carlson, Gaskey & Olds, P.C.

(57) ABSTRACT

A method of forming a gas turbine engine component including an airfoil and at least one shroud includes the steps of (1) machining a gas path surface of the at least one shroud utilizing a non-electrochemical machining (ECM) process, and (2) then utilizing ECM on at least the airfoil.

5 Claims, 2 Drawing Sheets

(56) References Cited

U.S. PATENT DOCUMENTS

| | | | |
|---|---|---|---|
| 8,268,137 B2* | 9/2012 | Hung | B23H 7/28 204/225 |
| 9,574,447 B2 | 2/2017 | Thompson et al. | |
| 9,682,437 B2 | 6/2017 | Platz et al. | |
| 9,708,916 B2 | 7/2017 | Zhang et al. | |
| 9,943,920 B2 | 4/2018 | Capriotti et al. | |
| 2012/0024717 A1* | 2/2012 | Roeblitz | B23H 3/00 205/645 |
| 2012/0103830 A1* | 5/2012 | Platz | B23H 3/00 205/686 |
| 2015/0027904 A1 | 1/2015 | Platz et al. | |
| 2016/0074952 A1 | 3/2016 | Huttner et al. | |
| 2016/0237826 A1 | 8/2016 | Rizzo | |

FOREIGN PATENT DOCUMENTS

| | | | |
|---|---|---|---|
| EP | 2786826 A1 | 10/2014 | |
| FR | 2652771 * | 4/1991 | B23H 7/26 |
| GB | 2041813 B | 8/1983 | |
| WO | 2019/192635 A1 | 10/2019 | |

OTHER PUBLICATIONS

European Search Report for EP Application No. 19201784.6 dated Feb. 19, 2020.

* cited by examiner

METHOD OF MACHINING GAS TURBINE ENGINE COMPONENTS

CROSS-REFERENCE TO RELATED APPLICATION

This application claims priority to U.S. Provisional Application No. 62/741,866 filed Oct. 5, 2018.

BACKGROUND

This application relates to a method of forming gas turbine engine components having an airfoil and at least two shrouds using a combination of conventional machining and electrochemical machining.

Electrochemical machining ("ECM") is a known and efficient machining method which is widely utilized. In electrochemical machining, shaped cathodes are brought near a workpiece, an electrolyte flows through the gap, and a large electric current is applied, resulting in electrolytic material removal. As the electrolytic material removal will occur across all or most of the workpiece surface simultaneously, the input workpiece geometry is equally important in controlling the finished workpiece geometry, as is the geometry of the cathodes.

In conventional electrochemical machining, a constant direct current is applied and the cathodes feed linearly in towards the workpiece. A method is further known in which the direct current is pulsed instead of constant. The pulsed current allows for higher machining voltages which gives better surface finish on the workpiece. A third method is further known in which the direct current is pulsed and a linear oscillation is superimposed on the feed of the cathodes along their axis of travel. In this method, the current pulses are synchronized with the oscillations of the cathodes so that the current "on" time occurs while the cathodes are closest to the workpiece. This allows machining at the smallest gap, which gives the best reproduction accuracy from the shaped cathodes into the workpiece and improved surface finish. This additionally allows increased electrolyte flow at the larger gaps allowing for improved removal of process waste and process heat.

There are challenges with using ECM to form many gas turbine engine components. In ECM, cathodes must be brought close to a work piece surface which is to be finished. This becomes complicated since many gas turbine engine components have an airfoil extending into a shroud which is roughly perpendicular to a radial axis through the airfoil. For airfoils with a single shroud, this problem is generally solved by shaping the cathode to simultaneously machine the airfoil and the shroud as well as a transition radius between the two. The linear axes are also sometimes set at an angle to the airfoil surface in order to have a component of the cathode travel in the direction of the shroud.

For gas turbine engine components with airfoils extending into multiple shrouds, ECM is especially complex as not all gas path surfaces are machinable with cathodes on linear axes in a single ECM step. The shrouds on an airfoil create all or part of the gas flow path of the compressor or turbine stage of which they are a part, and as such generally match the circular contour of the engine. Thus, the radially inner shroud will generally have an obtuse angle between the airfoil and the shroud while the radially outer shroud will generally have an acute angle between the airfoil and the shroud. These angles necessitate that the cathodes be fed in at an angle relative to the surface normal of the airfoil. If an ideal input workpiece geometry can be provided, the ECM process can be completed in two operations.

The input workpiece for an airfoil ECM process is generally bar stock or a forging. In the case of bar stock, at least one ECM general pre-contouring operation and ECM edge pre-forming operation would be required in addition to the two airfoil/shroud finishing operations. In the case of forgings, the acute angle on the radially outer shroud cannot be formed by the forging process. Additionally, the dimensional variation associated with most forging processes would necessitate significant material stock left on the airfoil surface in order for the electrochemical machining process to produce repeatable results.

The addition of extra ECM operations and extra stock material has a large impact on the processing cost of airfoils via ECM.

SUMMARY

In a featured embodiment, a method of forming a gas turbine engine component including an airfoil and at least one shroud includes the steps of (1) machining a gas path surface of the at least one shroud utilizing a non-electrochemical machining (ECM) process, and (2) then utilizing ECM on at least the airfoil.

In another embodiment according to the previous embodiment, step (2) includes, using a pulsed ECM process in which a DC current is pulsed with a frequency of between 10 and 50 Hz.

In another embodiment according to any of the previous embodiments, step (2) includes, using a precise ECM process in which a DC current is pulsed and a linear oscillation of a cathode with a frequency of between 10 and 50 Hz and a constant stroke length is applied in a cathode feed direction.

In another embodiment according to any of the previous embodiments, the current is applied at an angular timing of between 80 and 280 degrees of the oscillation, where 0 degrees represents the largest gap between the workpiece and cathode.

In another embodiment according to any of the previous embodiments, step (2) includes, using an oscillation of at least one of a cathode and the workpiece in a radial direction of the airfoil.

In another embodiment according to any of the previous embodiments, the oscillation of the at least one cathode and workpiece is achieved with piezoelectric elements or mechanically.

In another featured embodiment, a method of forming a gas turbine engine component including an airfoil and at least one shroud includes the steps of (1) forging an oversized or near-net airfoil shape, (2) machining an airfoil and flow path surfaces of shrouds to provide an optimized input geometry for an electrochemical machining (ECM) process, and (3) utilizing at least one ECM process on the airfoil.

In another embodiment according to the previous embodiment, step (2) includes, using a pulsed ECM process in which a DC current is pulsed with a frequency of between 10 and 50 Hz.

In another embodiment according to any of the previous embodiments, step (2) includes, using a precise ECM process in which a DC current is pulsed and a linear oscillation of a cathode with a frequency of between 10 and 50 Hz and a constant stroke length is applied in a cathode feed direction.

In another embodiment according to any of the previous embodiments, the current is applied at an angular timing of between 80 and 280 degrees of the oscillation, where 0 degrees represents the largest gap between the workpiece and cathode.

In another embodiment according to any of the previous embodiments, step (2) includes, using an oscillation of at least one of a cathode and the workpiece in a radial direction of the airfoil.

In another embodiment according to any of the previous embodiments, the oscillation of the at least one of the cathode and the workpiece is achieved mechanically or with piezoelectric elements.

In another embodiment according to any of the previous embodiments, a cathode is moved at an angle with a component towards the shroud and a component towards the airfoil during step (z).

In another featured embodiment, a method of forming a gas turbine engine component including an airfoil and at least one shroud includes the steps of (1) Machining an optimized input geometry from bar stock using a non-electrochemical machining (ECM) processing and (2) utilizing at least one ECM process on the airfoil.

In another embodiment according to the previous embodiment, step (2) includes, using a pulsed ECM process in which a DC current is pulsed.

In another embodiment according to any of the previous embodiments, step (2) includes, using a precise ECM process in which a DC current is pulsed and a linear oscillation of a cathode is applied in a cathode feed direction.

In another embodiment according to any of the previous embodiments, step (2) includes, using a lateral oscillation of a cathode to minimize mismatch between conventionally and electrochemically machined surfaces.

In another embodiment according to any of the previous embodiments, step (2) includes, using a lateral oscillation of a cathode to minimize mismatch between conventionally and electrochemically machined surfaces.

In another embodiment according to any of the previous embodiments, the oscillation of the cathode is achieved mechanically.

In another embodiment according to any of the previous embodiments, the oscillation of the cathode is achieved with piezoelectric elements.

These and other features of this application will be best understood from the following specification and drawings, the following of which is a brief description.

DETAILED DESCRIPTION

Figure 1:
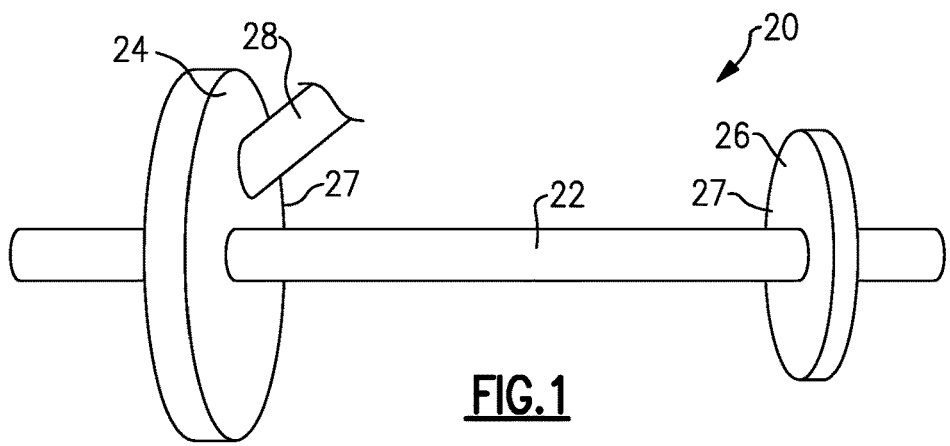
FIG. 1 shows a first step in a first method of machining.

FIG. 1 shows machining of a gas turbine engine component 20. The component 20 includes an airfoil 22 and shrouds 24 and 26. Surfaces 27 of the shrouds 24 and 26 face each other, and will form a portion of a gas flow path when the component 20 is mounted in a gas turbine engine. As such, it is important for the surfaces to be machined.

In the FIG. 1 method a conventional machining step is performed on the surfaces 27. This is shown schematically with a milling tool 28. Grinding or other conventional machining steps may alternatively be used. Machining can also be provided by more modern steps such as laser machining, electrical discharge machining, and water jet machining, as examples. Collectively all of these various machining steps could be known as "non-ECM processes." This definition carries over to all of the methods disclosed in the following paragraphs.

Figure 2:
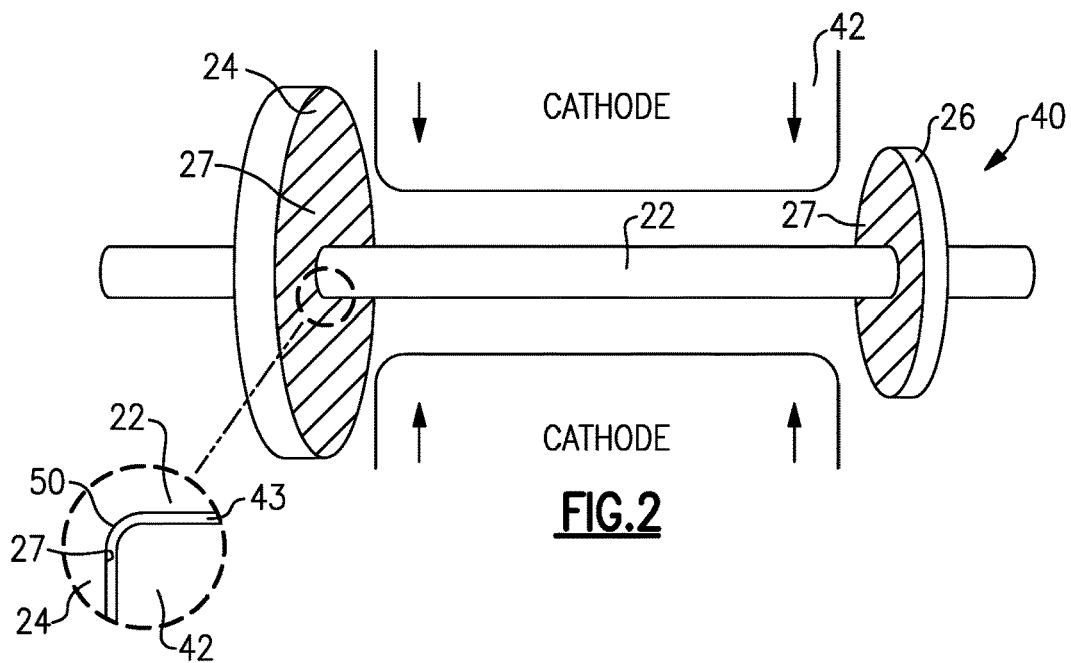
FIG. 2 shows a subsequent step.

FIG. 2 shows a step subsequent to the machining of the surfaces 27. Now, cathodes 42 are brought adjacent to the airfoil surface 22 to machine the airfoil. The ECM method utilized here may be generally as known. It is the combination of the conventional machining steps of FIG. 1 with the steps of FIG. 2 which is novel here.

As shown in a side bar, an area 50 merges the airfoil 22 into the surface 27. The cathode 42 may have a curved edge 43 at that surface which forms the merge area 50 between the two surfaces which are formed by distinct machining techniques.

Figure 3:
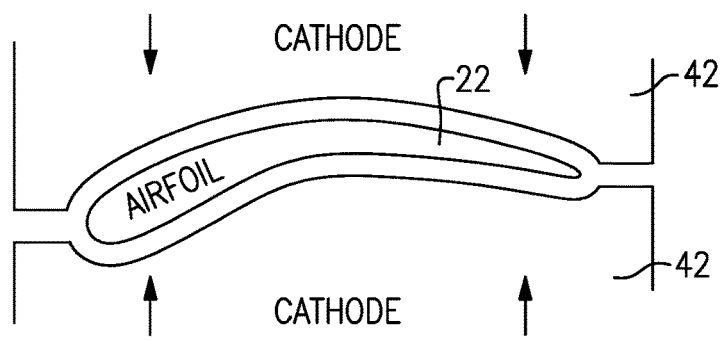
FIG. 3 is a side view of the FIG. 2 step.

FIG. 3 is a view generally perpendicular to that of FIG. 2.

Figure 4:
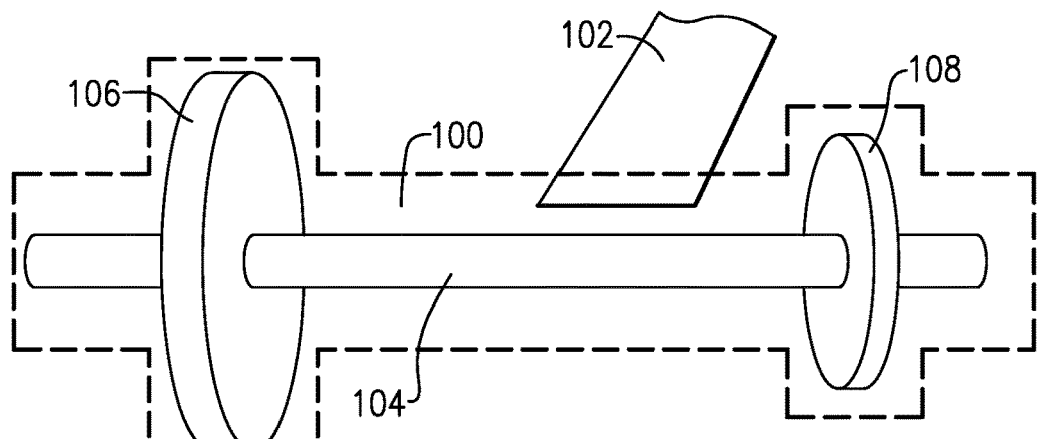
FIG. 4 shows an alternative method of machining.

FIG. 4 shows a distinct method. In this method an initial block 100 includes a good deal of additional material that must be removed to get to the airfoil 104 and shrouds 106 and 108. The material is cut away by conventional machining such as a milling or grinding operation shown schematically with tool 102.

For that matter, rather than a block 100 the FIG. 4 step could start from bar stock.

Figure 5:
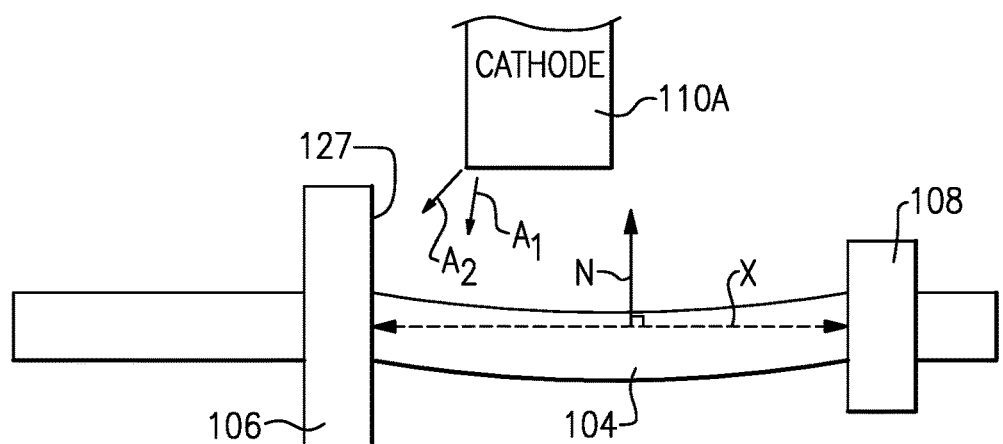
FIG. 5 shows a step subsequent to the step shown in FIG. 4.

As shown in FIG. 5, subsequent to reaching an intermediate part, an ECM cathode 110 is brought adjacent to the surface 127 of one of the shrouds 106. The cathode 110A is brought in at an angle A to machine the surface 127. The illustrated angle A is not intended to be a particularly desirable angle. The actual angle may be selected once one knows the involved geometries. Essentially, the cathode may be brought toward the airfoil but in a direction with a non-zero component X toward one of the surfaces on a shroud and a non-zero component Y towards airfoil 104. This will allow for the cathode to adjust to various angles between the shroud and the airfoil.

As one example a cathode feed direction on a pressure and suction side of the airfoil could be between 5 ($A_1$) and 40 ($A_2$) degrees offset from a normal N to a stacking axis X of the airfoil. A cathode feed rate could be between 0.05 and 0.75 mm/min during machining.

Figure 6:
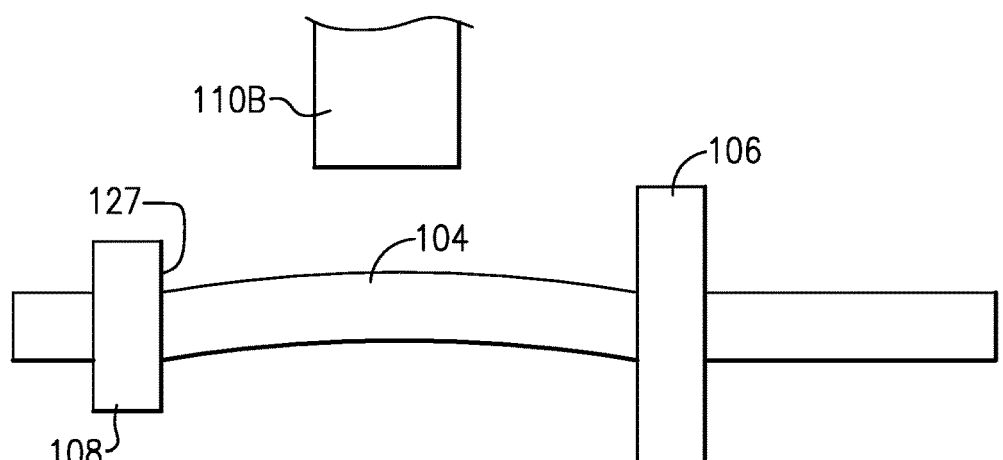
FIG. 6 shows a step subsequent to the step shown in FIG. 5.

As shown in FIG. 6, the intermediate part may be flipped over and the opposed surface 127 on the shroud 108 is machined with a cathode 110B moving at an angle in a manner similar to that mentioned above. Cathodes 110A and 110B will likely have different geometries designed as appropriate.

The airfoil 104 itself may be machined with steps as shown in FIGS. 2 and 3, or could be machined as part of the steps in FIGS. 5 and 6.

With any of these basic ideas there are other options which may be utilized. As examples, a pulsed ECM process may be utilized in which the current, and in particular a DC current is pulsed.

Further, a precise ECM process may be utilized wherein the DC current is pulsed and/or there is also linear oscillation of the cathode relative to its feed rate to provide even finer control over the final surface.

The pulsed current could have a frequency of between 10 and 50 Hz and a constant stroke length. In addition, the current could be applied at an angular timing of between 80 and 280 degrees of the oscillation where 0 degrees represents the largest gap between the workpiece and the cathode.

Further, there may be lateral oscillation of the cathode utilized to minimize mismatch between the conventional and ECM machined surfaces. This oscillation could be applied either by mechanical processes or by piezoelectric actuators.

In addition, such a lateral oscillation may be beneficial if steps 5 and 6 are utilized to remove any mismatch between the machining of FIGS. 5 and 6. Alternatively, such a step could be used to minimize mismatch between surfaces machined in separate electrochemical machining steps.

Although embodiments and methods have been disclosed, a worker of ordinary skill in this art would recognize that certain modifications would come within the scope of this disclosure. For that reason, the following claim should be considered to understand the full scope of this disclosure.

What is claimed is:

1. A method of forming a gas turbine engine component including an airfoil and at least one shroud comprising the steps of:
   (1) forging an oversized or near-net airfoil shape;
   (2) machining a workpiece having an airfoil and flow path surfaces of said at least one shroud to provide an input geometry for an electrochemical machining (ECM) process using a non-ECM process;
   (3) utilizing at least one ECM process on said airfoil;
   a cathode is moved at an angular direction with a non-zero component towards said at least one shroud and a non-zero component towards said airfoil during step (3);
   wherein said angular direction being between 5 and 40 degrees offset from a normal line to a stacking axis of the airfoil;
   wherein step (3) includes using a process in which a DC current is pulsed and a linear oscillation of the cathode occurs with a frequency of between 10 and 50 Hz and a constant stroke length is applied in a cathode feed direction; and
   wherein the cathode machines a surface of said at least one shroud while moving in said angular direction.

2. The method as set forth in claim 1, wherein a second cathode is utilized to provide an ECM machining process on said airfoil on an opposed surface of the shroud, and also while moving in an angular direction with a non-zero component toward said at least one shroud, and a non-zero component towards said airfoil.

3. The method as set forth in claim 2, wherein the non-ECM process of step 2 is one of milling or grinding.

4. The method as set forth in claim 3, wherein a cathode feed rate of between 0.05 and 0.75 millimeters per minute is utilized during step (3).

5. The method as set forth in claim 3, wherein the workpiece has two of said at least one shroud, and steps (2) and (3) machine both said shrouds.

* * * * *